US012725389B2

(12) United States Patent
Su et al.

(10) Patent No.: US 12,725,389 B2
(45) Date of Patent: Sep. 1, 2026

(54) ENVIRONMENT MANAGING AND MONITORING SYSTEM AND METHOD USING SAME

(71) Applicants: NavCore Tech Co. Ltd., Taoyuan City (TW); Cupola360 Inc., Hsinchu City (TW)

(72) Inventors: Yung-tai Su, Taoyuan City (TW); Hsin-lung Hsieh, Taoyuan City (TW); Yu-hsuan Liao, Taoyuan City (TW); Yu-min Chuang, Taoyuan City (TW); Pang-tzu Liu, Taoyuan City (TW); Chun-yueh Chen, Taoyuan City (TW); Jia-hao Lu, Taoyuan City (TW); Cheng-ju Hsieh, Hsinchu City (TW); Ching-wei Lee, Hsinchu City (TW); Tsung-hsun Tsai, Hsinchu City (TW); Po-yuan Kuo, Hsinchu City (TW); Po-yi Wu, Hsinchu City (TW); Chen-wei Chou, Hsinchu City (TW)

(73) Assignees: NavCore Tech Co. Ltd., Taoyuan City (TW); Cupola360 Inc., Hsinchu City (TW)

( * ) Notice: Subject to any disclaimer, the term of this patent is extended or adjusted under 35 U.S.C. 154(b) by 371 days.

(21) Appl. No.: 18/241,925

(22) Filed: Sep. 4, 2023

(65) Prior Publication Data

US 2024/0249494 A1 Jul. 25, 2024

Related U.S. Application Data

(60) Provisional application No. 63/439,886, filed on Jan. 19, 2023.

(51) Int. Cl.

*G06V 10/25* (2022.01)
*G06V 20/52* (2022.01)

(52) U.S. Cl.

CPC .............. *G06V 10/25* (2022.01); *G06V 20/52* (2022.01)

(58) Field of Classification Search

CPC .... G06V 10/25; G06V 20/52; G05B 19/0428; G05B 2219/24024

See application file for complete search history.

(56) References Cited

U.S. PATENT DOCUMENTS 6,215,519 B1 * 4/2001 Nayar .............. G08B 13/19608 348/E7.086
11,393,210 B2 * 7/2022 Felhi ...................... G06V 20/52

(Continued)

FOREIGN PATENT DOCUMENTS

CN 114979567 A 8/2022
TW M616653 U 9/2021

(Continued)

*Primary Examiner* — Matthew C Bella
*Assistant Examiner* — Andrew B. Jones
(74) *Attorney, Agent, or Firm* — Rivka Friedman

(57) ABSTRACT

An environment managing and monitoring system and a method using same are provided. The environment managing and monitoring system is configured to assist monitors to obtain real-time information of the monitoring field and control device in the monitoring field. The environmental managing and monitoring system includes at least one sub-system and a host system. The host system is configured to output a region of interest condition and a monitoring condition to the sub-system, wherein the sub-system is configured to generate monitoring results according to the monitoring conditions, and selects an image range from the captured wide-angle dynamic real-time images according to the region of interest condition.

15 Claims, 10 Drawing Sheets

(56) References Cited

U.S. PATENT DOCUMENTS

| | | | | |
|---|---|---|---|---|
| 11,438,553 | B1 * | 9/2022 | Ure | H04N 7/183 |
| 2020/0019787 | A1 | 1/2020 | Fahnestock et al. | |
| 2023/0280961 | A1 * | 9/2023 | Inoue | G06F 3/14 348/14.03 |
| 2024/0249494 | A1 | 7/2024 | Su et al. | |

FOREIGN PATENT DOCUMENTS

| | | |
|---|---|---|
| TW | M630942 U | 8/2022 |
| TW | M653905 U | 4/2024 |

* cited by examiner

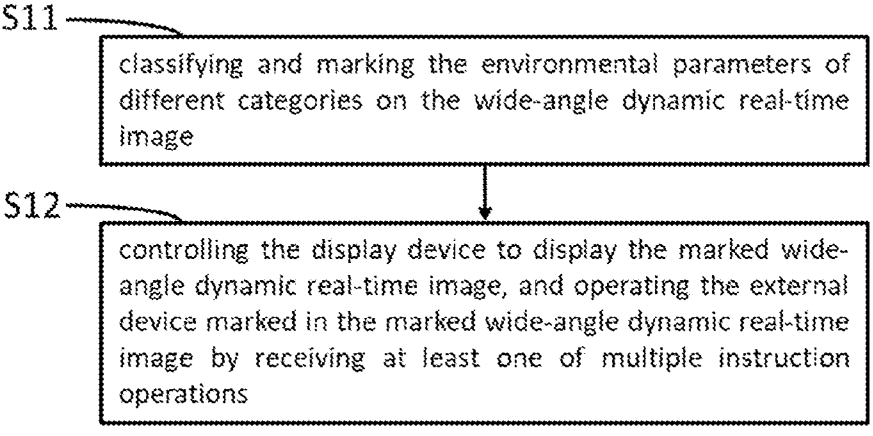

FIG. 9

S21
outputting an abnormal status condition to the sub-system, and controlling the sub-system to sense an abnormal status S22
generating an abnormal status information through the sub-system when the wide-angle dynamic real-time image and the environmental parameters sensed by the sub-system satisfies the abnormal status condition S23
transmitting the abnormal status information to the host system and the alarm device through the sub-system

FIG. 10

ENVIRONMENT MANAGING AND MONITORING SYSTEM AND METHOD USING SAME

CROSS-REFERENCE TO RELATED APPLICATIONS

This application claims the priority of U.S. provisional Application No. 63/439,886, filed on Jan. 19, 2023, the disclosure of which is incorporated herein by reference in its entirety.

FIELD OF INVENTION

The present application relates to an environment managing and monitoring system and method using same, in particular to an environmental managing and monitoring system and method using same for real-time reflection of the state of the monitoring environment.

BACKGROUND OF INVENTION

In the prior art, the monitoring results expressed by comparing the sensing signals with the preset data are distorted compared with the field conditions, and the user is unable to understand the details of the abnormal status conditions in the field. Since this type of monitoring can only determine whether an abnormal status has occurred through the changes in the recorded sensing signal, it is also difficult to synchronize the monitoring of large areas or areas with complex environmental conditions.

Even if the user installs a large number of sensors to overcome the above problems, the complexity of wiring and the vulnerability of the system will also increase due to the increase in the number of sensors used by the installed monitoring system. Therefore, the monitoring system itself will be more susceptible to anomalies that may cause it to lose its monitoring capability. Moreover, in order to synchronize and integrate a large amount of sensor data, noise needs to be filtered when receiving the sensing results to avoid distortion of the monitoring results. Therefore, even though the setup cost of the monitoring system has increased, the effect of improving the monitoring results is still limited. In addition, due to the aforementioned problems to be overcome in the prior art, the effectiveness of the monitoring system in eliminating emergencies in the monitored field, recording monitoring results, and analyzing emergencies is also limited.

Therefore, how to provide a monitoring system that can handle unexpected situations in the monitored field, reduce surveillance manpower, increase the ability to preserve evidence, and enhance the efficiency of analyzing the cause of the incident is an urgent issue for researchers in this field.

SUMMARY OF INVENTION

The object of the present application is to provide an environment managing and monitoring system and method using same, which properly solve the problems of the above-mentioned prior art.

Based on the above purpose, the present application provides an environment managing and monitoring system configured to assist monitors to obtain a real-time information of a monitoring field and control an external device in the monitoring field, the environmental managing and monitoring system including:

at least one sub-system including:

a wide-angle camera configured to capture a wide-angle dynamic real-time image of an installed location, and output at least one image range smaller than the wide-angle dynamic real-time image;

a sensor module configured to sense environmental parameters of the installed location; and a control module configured to be connected to the external device to control an operation of the external device; and a host system connected to each of the sub-systems, wherein the host system is configured to receive the wide-angle dynamic real-time images recorded by each of the sub-systems and the environmental parameters sensed by each of the sub-systems;

wherein the host system is configured to output a monitoring condition to the sub-system, wherein the sensor module returns a monitoring result to the host system according to the monitoring condition;

wherein the host system is configured to output a region of interest condition to the sub-system, wherein the wide-angle camera selects the at least one image range from the captured wide-angle dynamic real-time image according to the region of interest condition, and transmits the at least one image range to the host system;

wherein the host system is configured to control a display device connected to the host system to display an interpretation screen composed of the at least one image range and the monitoring result after receiving the at least one image range and the monitoring result; and wherein the host system is configured to receive at least one of various command operations, and output a control command to the control module to operate the external device displayed in the interpretation screen.

The present application also provides an environmental managing and monitoring method to assist monitors in obtaining real-time information of the monitoring field and controlling an external device in the monitoring field, the environmental managing and monitoring method including:

using at least one sub-system including:

a wide-angle camera configured to capture a wide-angle dynamic real-time image of an installed location, and output at least one image range smaller than the wide-angle dynamic real-time image;

a sensor module configured to sense environmental parameters of the installed location; and a control module configured to be connected to the external device to control an operation of the external device;

using a host system to receive the wide-angle dynamic real-time image recorded by each of the sub-systems and the environmental parameters sensed by each of the sub-systems;

using the host system to output a monitoring condition to the sub-system, and returning a monitoring result to the host system through the sensor module according to the monitoring condition;

using the host system to output a region of interest condition to the sub-system, selecting the at least one image range from the captured wide-angle dynamic real-time image according to the region of interest condition through the wide-angle camera, and transmitting the at least one image range to the host system;

using the host system to receive the at least one image range and the monitoring result, and controlling a display device connected to the host system to display an interpretation screen composed of the at least one image range and the monitoring result through the host system; and using the host system to receive at least one of various instruction operations, and outputting a control instruction to the control module through the host system to operate the external device displayed in the interpretation screen.

The present application has at least the following beneficial effects: the embodiments of the present application can be implemented by combining the filtered sensing signals and wide-angle dynamic real-time images into a real-time interpretation screen through the host system, and present the interpretation screen on the display panel connected to the host system, to monitor the on-site conditions of the monitoring environment, and help monitors intuitively and specifically understand and judge the details of the monitored field. In addition, the environmental managing and monitoring system of the present application can also automatically monitor whether an emergency event occurs and alert monitor when the emergency event occur, and at the same time record the overall process of the emergency event in detail to facilitate the subsequent analysis of abnormal status, so as to achieve the effect of accelerating the efficiency of the evidence collection and the analysis of the cause of the accident. Furthermore, through the environmental managing and monitoring system of the present application, the selection of abnormal status conditions and image ranges of areas of close concern can also be automatically selected by the monitoring system, so as to greatly reduce a consumption of monitoring resources. In addition, abnormal status conditions in the monitored field can be automatically detected by the sub-system and eliminated through the control of the host system, thereby greatly improving an operational stability of the monitored field and increasing the efficiency of reducing damage in a timely manner.

The following detailed descriptions are provided in conjunction with the accompanying figures through specific embodiments, so that it is easier to understand the purpose, the technical content, the characteristics and effects of the present application.

DESCRIPTION OF FIGURES

FIG. 9 is a schematic flow chart of the environmental managing and monitoring method according to another embodiment of the present application.

FIG. 10 is a schematic flowchart of the environmental managing and monitoring method according to yet another embodiment of the present application.

DETAILED DESCRIPTION OF EMBODIMENTS

The technical solutions in the embodiments of the present application will be clearly and completely described below in conjunction with the accompanying figures in the embodiments of the present application. Obviously, the described embodiments are only a part of the embodiments of the present application, rather than all implementations example. In addition, it should be understood that the specific embodiments described here are only used to illustrate and explain the present application, and are not intended to limit the present application.

Please refer to the figures in the accompanying figures, wherein the same component symbols represent the same components.

The present application provides an environmental managing and monitoring system configured to assist monitors to obtain a real-time information of a monitoring field and control device in the monitoring field. Please refer to FIG. 1, the environmental managing and monitoring system provided by the present application is composed of a host system 10 and at least one sub-system 20. The host system 10 is configured to output a region of interest condition to the sub-system 20. The sub-system 20 generates monitoring results according to the monitoring conditions, and selects an image range from the captured wide-angle dynamic real-time images according to the region of interest conditions. After the monitoring result and the image range are generated, the sub-system feedback the monitoring result and the image range to the host system 10.

In detail, the present application provides an environmental managing and monitoring system in which the filtered image ranges and monitoring results are composed into a real-time interpretation screen by the host system 10, and the interpretation screen is presented on a display device connected to the host system 10. At the same time, the host system 10 is also configured to receive at least one of a plurality of command operations to operate an external device that is currently displayed in the interpretation screen.

Figure 1:
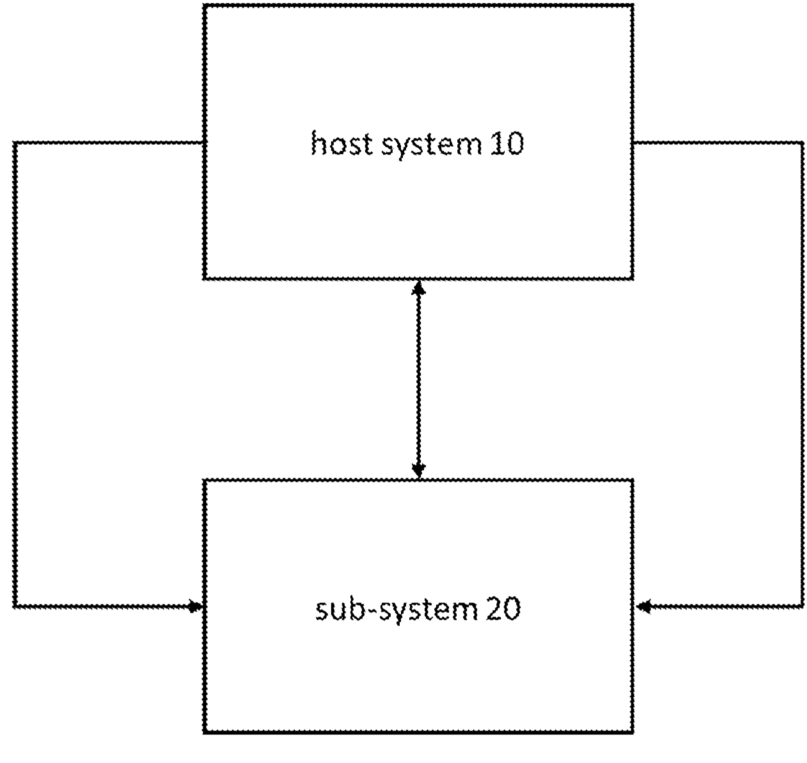
FIG. 1 is a schematic block diagram of an environmental managing and monitoring system according to one embodiment of the present application.

It should be noted that FIG. 1 is intended to exemplarily depict the signal transmission and signal transmission direction existing between the host system 10 and the sub-system 20 of the present application. In different embodiments of the present application, different transmission sequences of signals will produce different technical effects, which will be described later. Therefore, the signal transmission sequence between the host system 10 and the sub-system 20 is not limited in FIG. 1.

In addition, the various instruction operations involved in the foregoing description are determined according to the input interface of the host system 10. For example, the command operation can be achieved through touch when the input interface configured on the host system 10 includes a touch panel, wherein the input interface includes a currently data input device. Alternatively, in order to improve the closure, stability and security of the environmental managing and monitoring system, the command operation is to directly transmit an encrypted command operation to the signal receiving module of the host system 10, and the command operation is decrypted and executed through the host system 10. That is, in another embodiment of the present application, the host system 10 is further provided with an encryption module coupled or connected to the input interface and the signal receiving module.

The host system 10 of one embodiment of the present application and the sub-system 20 of one embodiment of the present application will be disclosed below through FIGS. 2 and 3.

Figure 2:
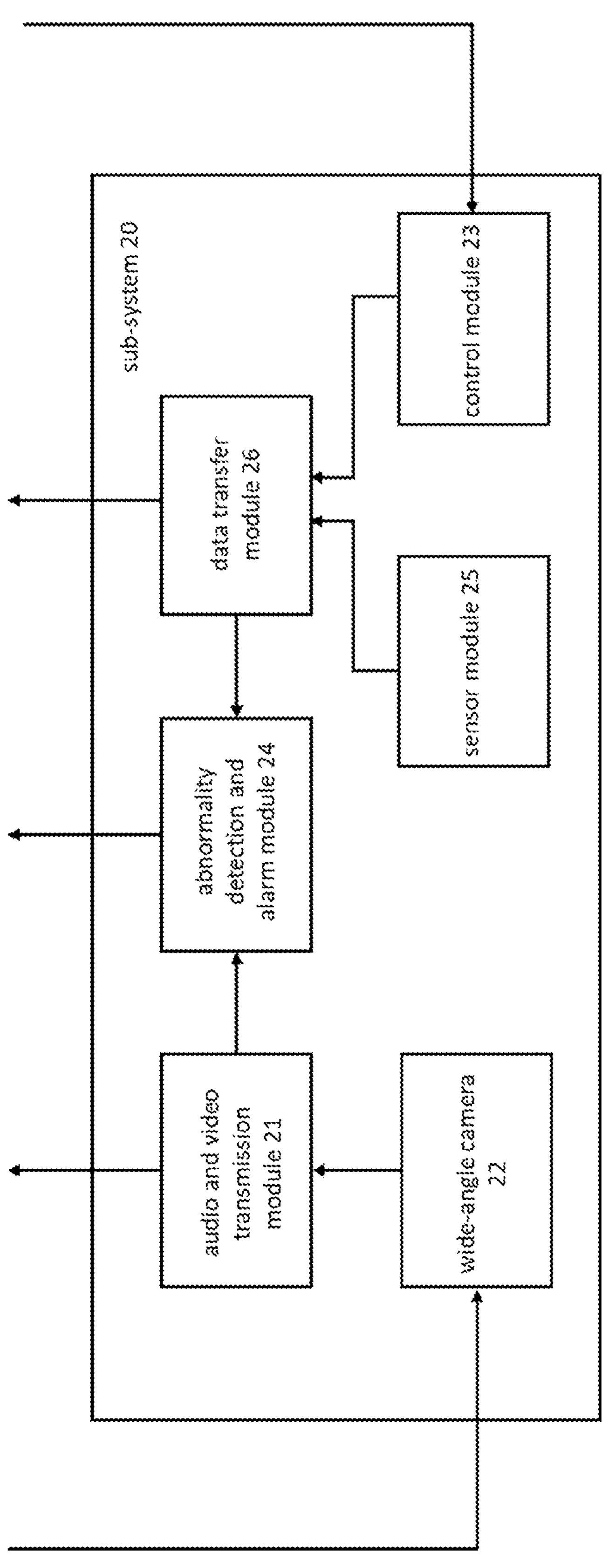
FIG. 2 is a schematic block diagram of a sub-system according to one embodiment of the present application.

Please refer to FIG. 2, FIG. 2 is a schematic block diagram of a sub-system according to one embodiment of the present application. In the embodiment disclosed in FIG. 2, the sub-system 20 includes: a wide-angle camera 22 configured to capture a wide-angle dynamic real-time image of an installed location and receive a region of interest (ROI) condition in the wide-angle dynamic real-time image, to select the image range, and further output at least one image range smaller than the wide-angle dynamic real-time image. The sensor module 25 is configured to sense the environmental parameters of the installed location. The control module 23 is configured to connect with external devices to control the operation of external devices. The sensor module 25 and the control module 23 output signals to the data transmission module 26. The wide-angle camera 22 outputs wide-angle dynamic real-time images and image ranges to the audio and video transmission module 21. An anomaly detection and alarm module 24 is also provided between the audio and video transmission module 21 and the data transmission module 26.

In different embodiments of the present application, the sensor module 25 includes at least one of a variety of sensors such as a temperature sensor, a motor speed sensor, a pressure sensor, an infrared sensor, a voltage sensor, a current sensor, a level meter, a chemical composition sensor, a moisture content sensor, a pH value sensor, a humidity sensor, and a weight sensor. Different types of sensors are distributed to collect sensing data on the pipes in the field being sensed, in the chemical tank, or on the circuit path of the electrical device to collect the sensing data. The types of the sensors mentioned above are only examples, rather than limitations of the present application. Other sensor modules that exist or will be developed in the future can also apply the concepts of the present application.

The control module 23 includes At least one of a motor control module, a temperature control module, a valve switch control module, an emergency shutoff switch control module, an alarm switch control module, a solution injection control module, and a tank rotation control module. The control module 23 is also configured to operate according to the control command output by the host system 10.

It should be noted that the sub-system 20 also includes an audio and video transmission module 21 connected to the wide-angle camera 22, and an abnormality detection and alarm module 24 connected with the audio and video transmission module 21 and the data transmission module 26 respectively. The wide-angle camera 22 transmits wide-angle dynamic real-time images to the anomaly detection and alarm module 24 through the audio and video transmission module 21, and the anomaly detection and alarm module 24 analyzes the data transmitted by the data transmission module 26 and the wide-angle dynamic real-time images transmitted by the audio and video transmission module 21 to enable the sub-system 20 to independently analyze the environmental conditions of the installed location. The abnormal detection and alarm module 24 is also configured to transmit abnormal alarms to the outside. It should be noted that, in other embodiments of the present application, at least one of the audio and video transmission module 21, the abnormality detection and alarm module 24, or the control module 23 is connected or coupled to the data transmission module 26 to directly transmit the image range, abnormal alarm, or monitoring results.

Figure 3:
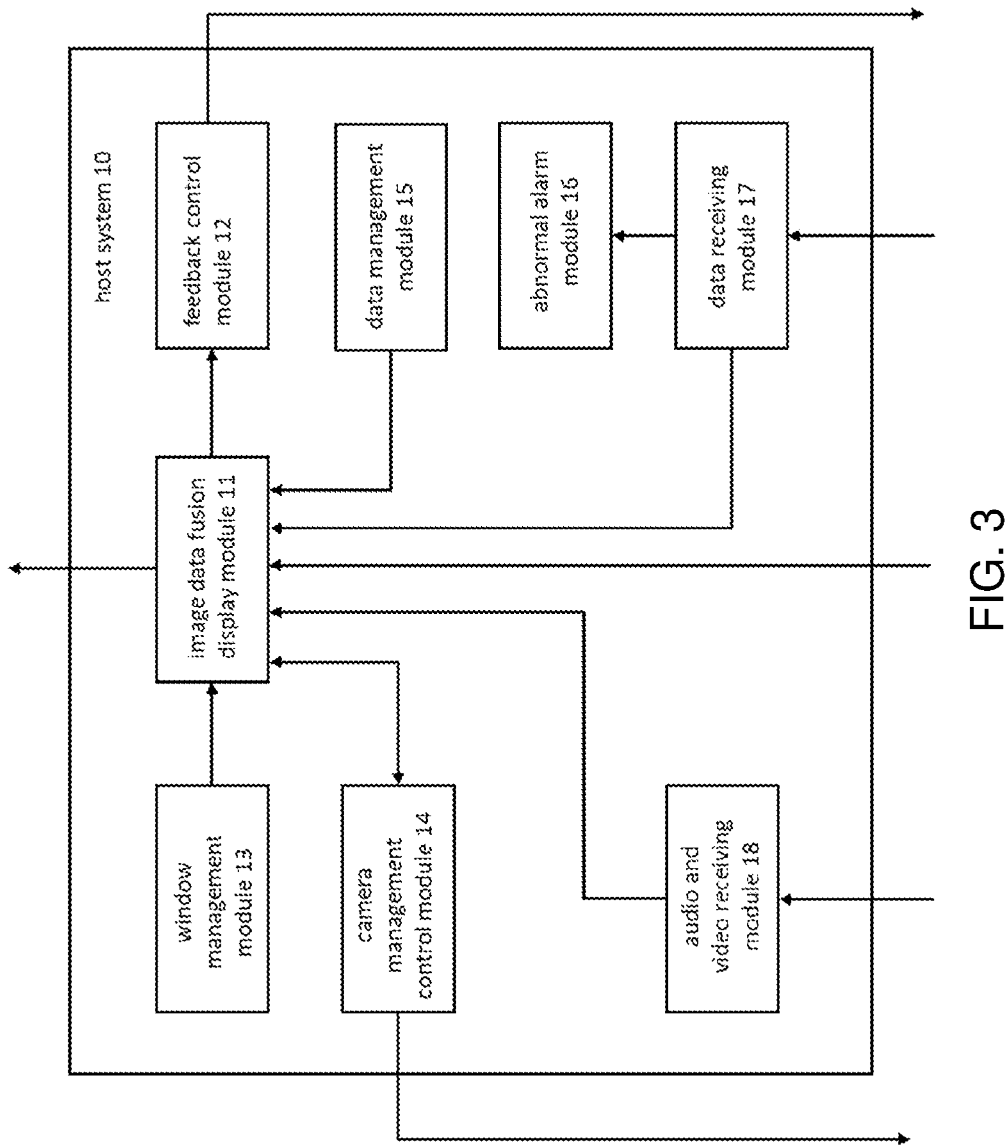
FIG. 3 is a schematic block diagram of a host system according to one embodiment of the present application.

Please refer to FIG. 3, FIG. 3 is a schematic block diagram of a host system 10 according to one embodiment of the present application. The host system 10 includes: an image data fusion display module 11 configured to receive wide-angle dynamic real-time images, monitoring results and image ranges. The feedback control module 12 is connected to the image data fusion display module 11, and the feedback control module 12 is configured to output control signals for controlling external devices and monitor conditions for defining monitoring events of the sensor module 25 of the sub-system 20. The camera management control module 14 is connected to the image data fusion display module 11, and the host system 10 outputs the ROI condition to the wide-angle camera through the camera management control module 14. It should be noted that the camera management control module 14 feedbacks a notification of the completion of the setting to the image data fusion display module 11 when the wide-angle camera of the sub-system connected to the camera management control module 14 receives the region of interest condition and completes the setting. In addition, the audio and video receiving module 18 is connected to the audio-visual output end of the sub-system 20 to receive wide-angle dynamic real-time images and image ranges. The data receiving module 17 receives monitoring results output by the sub-system 20. It should be noted that the data receiving module 17 is also connected to the abnormal alarm module 16, and the host system 10 notifies the external alarm device through the abnormal alarm module 16.

It should be noted that the above-mentioned image data fusion display module 11 output region of interest condition setting method includes at least one of user selection, coordinate setting, object detection method, dynamic detection method, or threshold setting of environmental parameters; or the ROI condition is through feature extraction, human pose estimation, foreground detection, scale-invariant feature transform (SIFT), histogram of oriented gradient (HOG), etc., or the region of interest condition is an object tracking condition achieved by other detection and tracking methods. One of the characteristics of the present application is that although the image data fusion display module 11 receives the wide-angle dynamic real-time image and the image range at the same time, the host system 10 does not use the wide-angle dynamic real-time image to generate any other image range. That is to say, all the finally presented images except the wide-angle dynamic image are from the wide-angle camera 22 according to the ROI condition to select and output the image range from the wide-angle dynamic real-time image. This design can effectively transfer the system burden of a host system to a plurality of sub-systems, and the pixel requirements of the wide-angle dynamic real-time images transmitted to the host system 10 are relatively low.

For example, the environmental monitoring system of the present application is set in a factory, the sub-system 20 judges whether the staff appearing in the wide-angle dynamic real-time image has incomplete clothing, such as not wearing a helmet, mask, protective clothing, or other safety device, or, combining facial features and identification card data to compare the identity of the person by receiving the region of interest conditions output by the host system 10. In another embodiment of the present application, the image range selected by the sub-system 20 moves along with the dynamic image that satisfies the action condition when the ROI condition includes a dynamic condition. Alternatively, the region of interest condition includes comparing the color of the solution in the tank with the preset tank color. The image range where the color changes in the tank is tracked image range when the color of the solution in the tank satisfies with the preset tank color condition.

In one embodiment of the present application, the host system 10 also includes a window management module 13, the window management module 13 is connected to the image data fusion display module 11. The monitor can adjust the display screen of the display device connected to the image data fusion display module 11 through the window management module 13. For example, control the display device to simultaneously display the interpretation screen and select the wide-angle dynamic real-time images output by different sub-systems. Alternatively, the window management module 13 outputs a display priority sorting method for displaying different image ranges and wide-angle dynamic real-time images to the image data fusion display module 11, wherein the image data fusion display module 11 automatically sorts the order of the monitoring results and image ranges filled in the interpretation screen according to a display priority value. The wide-angle dynamic real-time image part selected by the window management module 13 can also be designated as a new image range, and the priority value of the image range can also be marked by the window management module 13.

It should be noted that the aforementioned selection and adjustment process includes selecting any part of the wide-angle dynamic real-time image, and adjusting the size of the selected part of the image presented on the interpretation screen. That is, in yet another embodiment of the present application, the image range and its size presented on the interpretation screen, as well as the number of image ranges displayed on the interpretation screen can also be set up according to the wide-angle dynamic real-time image by the window management module 13 provided in the host system 10.

In one embodiment of the present application, the host system 10 also includes a data management module 15, wherein the data management module 15 is configured to classify the environmental parameters into different categories and mark them on the wide-angle dynamic real-time image. The host system 10 is configured to control the display device to display the marked wide-angle dynamic real-time image, and operate the external device which marked in the marked wide-angle dynamic real-time image by receiving at least one of multiple instruction operations.

In another embodiment of the present application, the host system 10 includes a window management module 13 and a data management module 15. At this time, different types of environmental parameters also have priority values. Therefore, the display priority ranking method includes comparing the image ranges in different ranges in the wide-angle dynamic real-time image and the sum of the priority values of the environmental parameters, or, different types of environmental parameters directly have different priority levels. The display priority sorting method first compares the image ranges containing high priority levels, and then compares the sum of the priority values of each image range, and finally fills the image range into the interpretation screen according to the priority level and priority value sorting of the comparison results.

In one embodiment of the present application, the host system 10 and the sub-system 20 are respectively equipped with communication devices, wherein the user can communicate with the communication device of the sub-system in real time through the communication device of the host system. For example, the supervisor of the host system instructs the on-site personnel at the location of the sub-system to eliminate the abnormal status immediately through the communication device.

In one embodiment of the present application, the monitoring condition output from the host system 10 to the sub-system 20 includes a position monitoring condition, wherein the sensor module 25 feedbacks the monitoring result to the host system 10 according to the monitoring condition. At this time, the monitoring result includes a position information, wherein a restricted condition of the ROI condition includes the aforementioned position information, and the image range selected by the wide-angle camera 22 includes the range of the position information. The position information is the position information of the setting position of the sensor module that detects the environmental parameters, or the position information is generated by combining the position and direction of the sensor settings to compare the time difference and intensity of the environmental parameters received by the plurality of sensor modules. In one embodiment of the present application, the sensor module 25 is installed on the wide-angle camera 22. The sub-system 20 uses the sensor module 25 installed on the wide-angle camera 22 to calculate the position information in conjunction with information on the location associated with the shooting lens, the angle of view of the wide-angle dynamic real-time image, and the monitoring results. This calculation can be completed through the edge computing module installed in the sub-system 20, wherein the edge computing module is at least connected with the sensor module 25 and the wide-angle camera 22.

For example, the sensor module 25 includes a sound source sensor disposed on the wide-angle camera 22. The monitoring conditions output by the host system 10 include sound source detection conditions The sensor module 25 integrates the sound source position information of the sound source into the monitoring result when the sound source sensor senses a sound source that satisfies the sound source detection condition. The ROI condition is generated based on the sound source location information, the image range selected by the wide-angle camera 22 includes the range of the sound source location information, and the specific sound source type can be distinguished through the frequency range. The aforementioned monitoring conditions include using the sound source sensor to calculate beamforming to estimate the direction of arrival, and then generate the detection condition of the possible sound source direction. The method for estimating the direction of the sound source can be achieved through a maximum likelihood (ML) method, a time delay estimation (TDE) method, and an eigenstructure method. Alternatively, comparing the sound intensities of the frequency to be detected received by the sensor module 25, combining the pre-set angle of view of the wide-angle camera 22 and the setup position of the sound source sensor placed in the wide-angle camera 22, and comparing the direction of the angle of view of the wide-angle animated real-time image with the difference in the intensities of the sound source detected by the sound source sensors in different directions of the wide-angle cameras 22, thereby obtaining the direction of the sound source.

In particular, in the present application, the host system 10 controls a display device connected to the host system 10 to display an interpretation screen including the image range and the monitoring results by the aforementioned methods, and receives at least one of a plurality of command operations to output a control command to the control module 23 to operate the external device displayed in the interpretation screen when the host system 10 receives the image range and the monitoring results. It should be noted that the composition of the image range and the monitoring results herein includes directly labeling the monitoring results on the image range.

In addition, in another embodiment of the present application, the sensor module 25 is connected to the external device controlled by the control module 23, and the aforementioned environmental parameters also include the operating status parameters of the connected external device. The aforementioned operating status parameters include for example, whether the detected device has started operating and the number of times it has been operated. For example, the environmental parameters include the temperature, pH value, and chemical composition ratio of the solution tank that can be controlled. Alternatively, the environmental parameters include parameters that represent whether the emergency shutdown switch control module has been pressed and the number of times it has been pressed between a provided period when the connected external device is an emergency shut-off switch control module installed for emergency shutdown facility.

Figure 4:
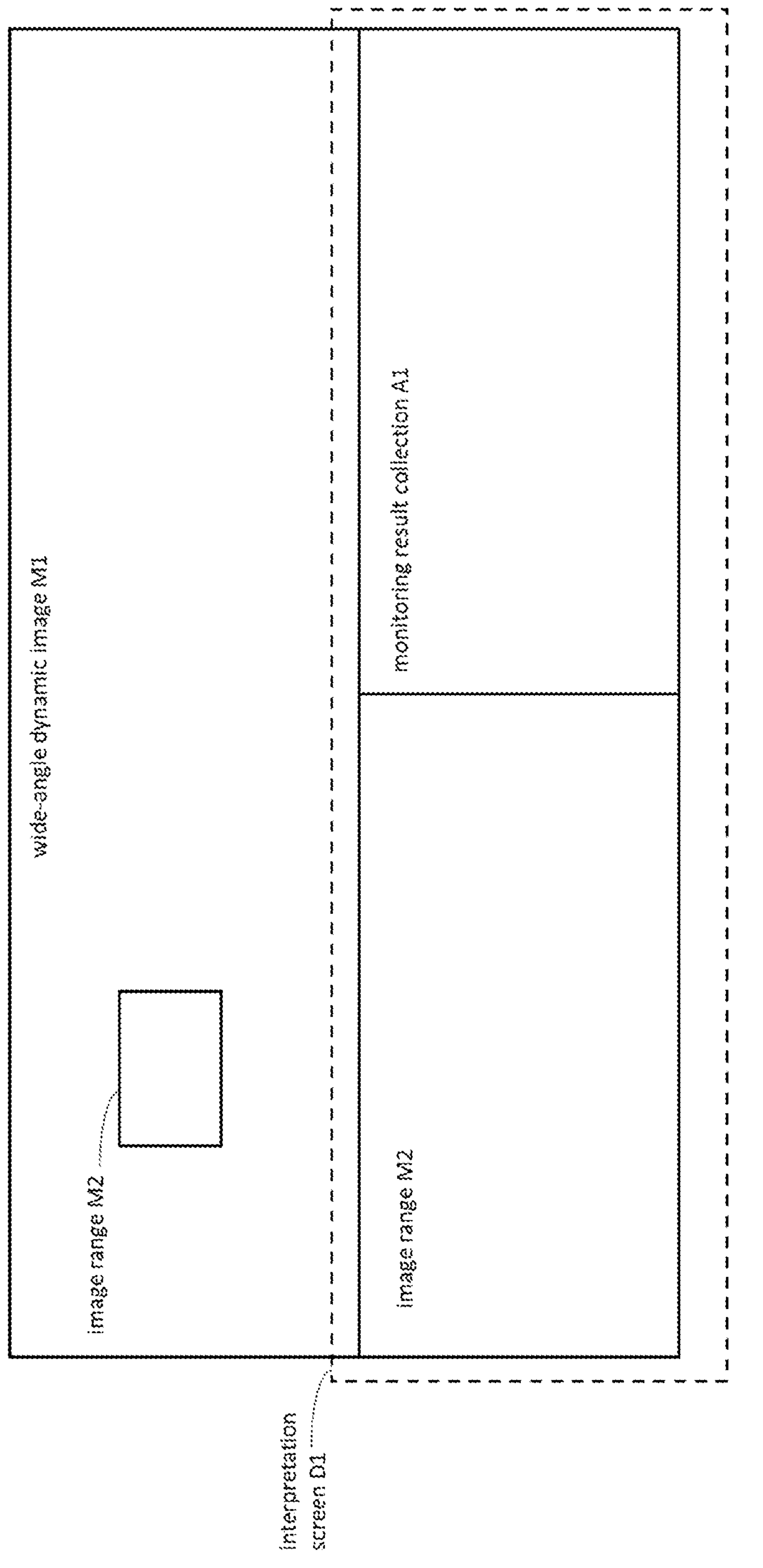
FIG. 4 is a schematic diagram of signal transmission between the host system and the data analysis module according to one embodiment of the present application.

Please refer to FIG. 4, FIG. 4 is a schematic diagram of signal transmission between the host system and the data analysis module according to one embodiment of the present application. An upper half of the display screen displays the wide-angle dynamic image M1. The image range M2 and the monitoring result collection A1 are simultaneously displayed on the lower half of the display screen. That is, the upper half of the display screen displays a wide-angle dynamic image, and the lower half displays an interpretation screen D1. However, the disclosed embodiment of the present application is not limited to the embodiment disclosed in FIG. 6. With reference to the foregoing description, a number of wide-angle dynamic images and image ranges of the present application is not limited here. That is, the number of wide-angle dynamic images M1 and image range M2 in the display screen can exceed one. In addition, a proportion of the wide-angle dynamic image and the interpretation screen in the display screen can also be adjusted through the window management module 13. It should be noted that, in addition to display the monitoring results transmitted by the sub-system 20, the aforementioned monitoring result collection A1 also includes text results and charts generated by the image data fusion display module 11 in the host system 10 after analyzing the monitoring results and old data. For example, monitoring results collection A1 displays the output of the tank body liquid volume judged by the host system 10 combined with the monitoring results, the text mark of the abnormal status of the tank body, the chart of the estimated achievement rate of this month, the yield rate of the specified cycle, analysis of actual output and estimated output for a specified period, and corresponding detection time records.

It needs to be explained that in another embodiment of the present application, the abnormality detection and alarm module 24 of the sub-system 20 is also include an edge computing module, and the abnormality detection and alarm module 24 is connected to the alarm device 211. The edge computing module is configured to sense abnormal status according to the abnormal status condition output by the host system 10. The abnormal detection and alarm module 24 generates abnormal status information when the wide-angle dynamic real-time image and environmental parameters sensed by the sub-system 20 satisfy the abnormal status condition. The abnormal detection and alarm module 24 is configured to transmit abnormal status information to the host system 10 and the alarm device. Thus, in this embodiment, the sub-system 20 autonomously detects whether there is an abnormality at the installed position through the edge computing module, and through warning devices such as buzzers, emergency signal notification devices, and abnormal status condition transceivers, etc., to immediately notify the operator in the field monitored by the sub-system 20 that the abnormal status occurred.

In another embodiment of the present application, the abnormal detection and alarm module 24 selects at least one abnormal image range from the wide-angle dynamic real-time image according to the abnormal status condition. The host system 10 receives the abnormal image range through the audio and video receiving module 18, and the display device is controlled to display an abnormal image interpretation screen composed of the abnormal image range and sensing parameters when the wide-angle dynamic real-time image is selected for the abnormal image range. It should be noted that the composition of the abnormal image range and the sensing parameters here includes directly marking the sensing parameters on the abnormal image range.

The edge computing module includes a deep learning module, such as a multi-layer perceptron (MLP), a deep neural network (DNN), a convolutional neural network (CNN), a recurrent neural network (RNN), etc., for feature recognition. In one embodiment of the present application, the edge computing module and the abnormal detection and alarm module 24 are arranged between the wide-angle camera 22 and the signal transmission path of the sensor module 25, wherein the edge computing module and the abnormal detection and alarm module 24 are both coupled as a chip. It should be noted that this chip is not currently available in the market, but is a chip specially designed to achieve the functions of the sub-system 20 of the present application. In other words, the abnormality detection and alarm module 24 can also be used to independently generate analysis charts. In this embodiment, the monitoring result A1 displayed on the display controlled by the host system 10 directly displays the analyze charts generated by the abnormality detection and alarm module 24.

Figure 5:
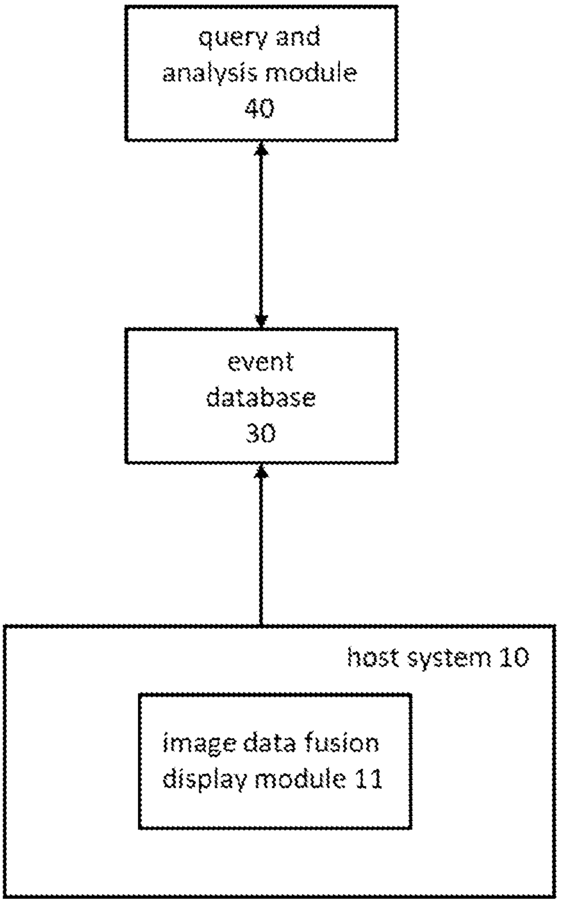
FIG. 5 is a schematic block diagram of an environmental managing and monitoring system according to another embodiment of the present application.

Please refer to FIG. 5, FIG. 5 is a schematic block diagram of an environmental managing and monitoring system according to another embodiment of the present application. In one embodiment of the present application, the host system 10 starts to record a video of the image range from a start time point to an end time point of an abnormal status information when the host system 10 receives the abnormal status information, wherein the host system 10 is configured to store the video of the image range from the start time point to the end time point of the abnormal status in the event database connected to the host system 10.

In another embodiment of the present application, the host system 10 is configured to record the start time point and the end time point of the abnormal status information when the host system 10 receives the abnormal status information, wherein the host system 10 marks the start time point and the end time point on a video of the wide-angle dynamic real-time image, and a marked video of the wide-angle dynamic real-time image is stored in the event database 30 connected to the host system 10.

In another embodiment of the present application, the environmental managing and monitoring system also includes a query and analysis module 40 connected to the event database 30, wherein the retrieval condition in the query and analysis module 40 is synchronized with the image range selected by the window management module 13 and the environmental parameters classified by the data management module 15, so that through the query and analysis module 40, the video of the image range during a query time period, the marked video of the wide-angle dynamic real-time image, the marked video of the wide-angle dynamic real-time image, the video of the wide-angle dynamic real-time image from the start time point to the end time point of the abnormal status, and corresponding environmental parameters can be quickly obtained.

In addition, in another embodiment of the present application, in a relatively complex environment monitoring system layout field, due to the large amount of data and the sub-system 20 is easily damaged by the environment, the query and analysis module is also configured to read the monitoring results and wide-angle dynamic images stored in the event database 30, and combine past records to generate analysis charts. In this embodiment, the query and analysis module 40 is configured to control the event database to feedback the generated charts and analysis results to the host system 10, and the host system 10 is configured to control the connected display device to display the generated charts and analysis results generated by the query and analysis module 40 on the monitoring result collection A1 aforementioned by FIG. 4, and the host system 10 is configured to generate new monitoring conditions and ROI conditions based on the data feedbacked by the event database 30.

Figure 6:
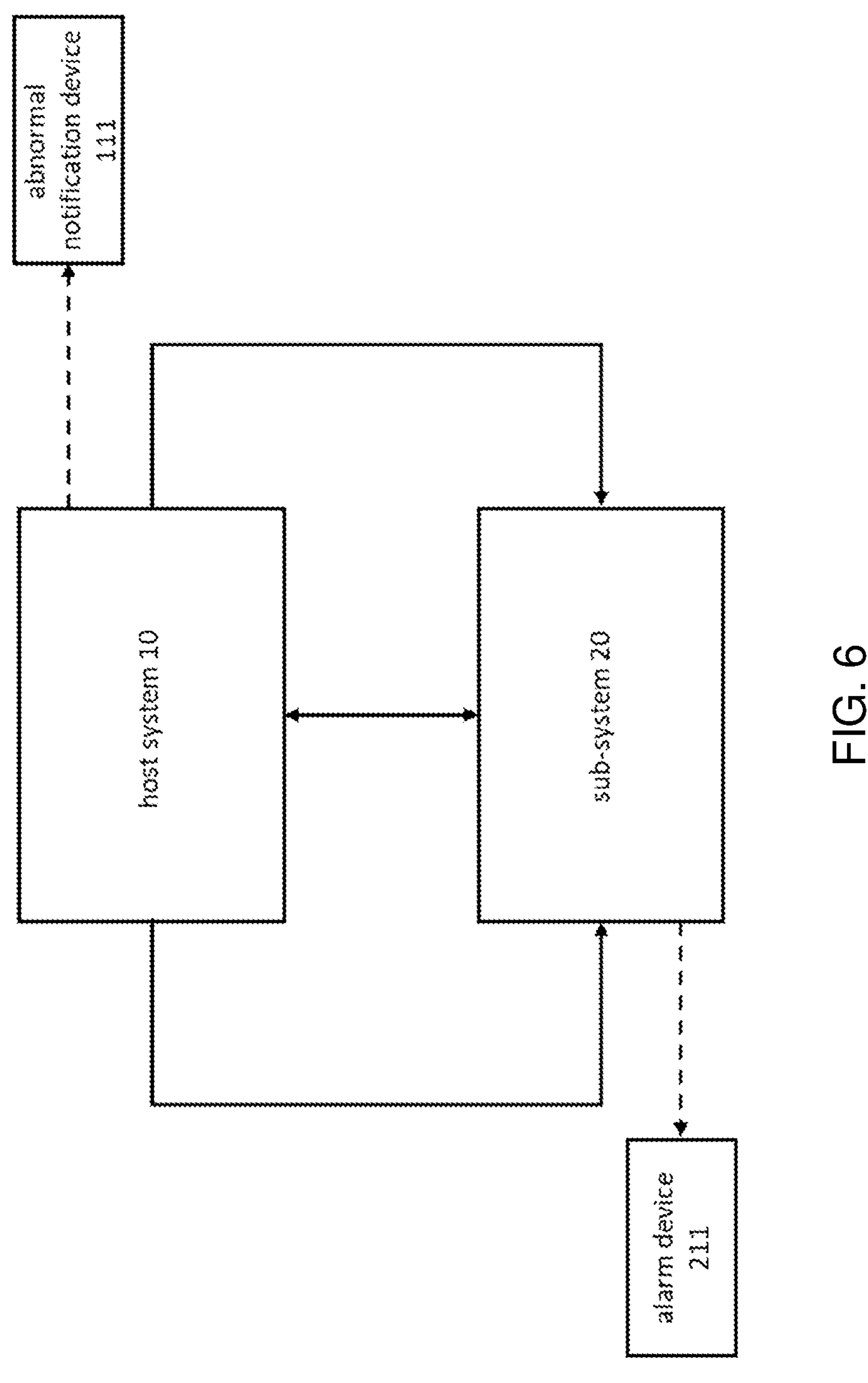
FIG. 6 is a schematic diagram of a display screen of a display device connected to a host system in the environmental managing and monitoring system according to one embodiment of the present application.

Please refer to FIG. 6, FIG. 6 is a schematic block diagram of the environmental managing and monitoring system according to another embodiment of the present application. The host system 10 is also connected to the abnormal notification device 111, and the sub-system 20 is also connected to the alarm device 211. The host system 10 sends a message to the monitor through the abnormal notification device 111 and the sub-system 20 notifies the operator through the alarm device 211, when the host system 10 and the alarm device 211 receives an abnormal status information.

Figure 7:
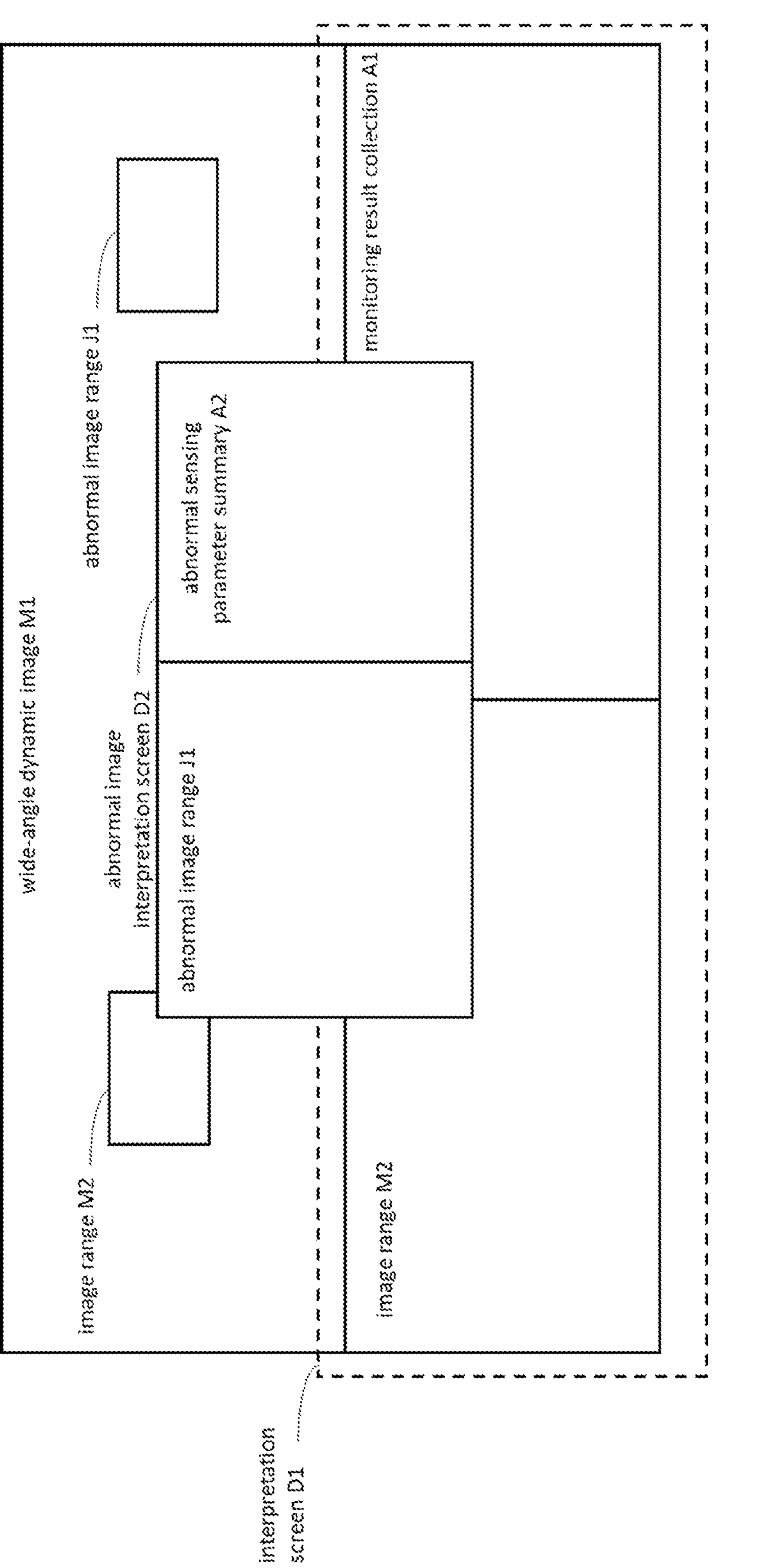
FIG. 7 is a schematic diagram of the display screen of the display device connected to the host system in the environmental managing and monitoring system according to another embodiment of the present application.

Please refer to FIG. 7, FIG. 7 is a schematic diagram of the display screen of the display device connected to the host system in the environmental managing and monitoring system according to another embodiment of the present application. In addition to display the original image, the display screen also covered by the abnormal image interpretation screen D2 when the upper system 20 outputs the above-mentioned abnormal image interpretation screen D2. The abnormal image interpretation screen D2 includes the abnormal image range J1 and the abnormal sensing parameter summary A2 that satisfies the aforementioned abnormal status condition conditions. The display mode of the abnormal image interpretation screen can also be adjusted through the window management module 13. In another embodiment of the present application, the abnormal image interpretation screen D2 can also be set to display only the abnormal image range J1 or the abnormal sensing parameter summary A2.

Figure 8:
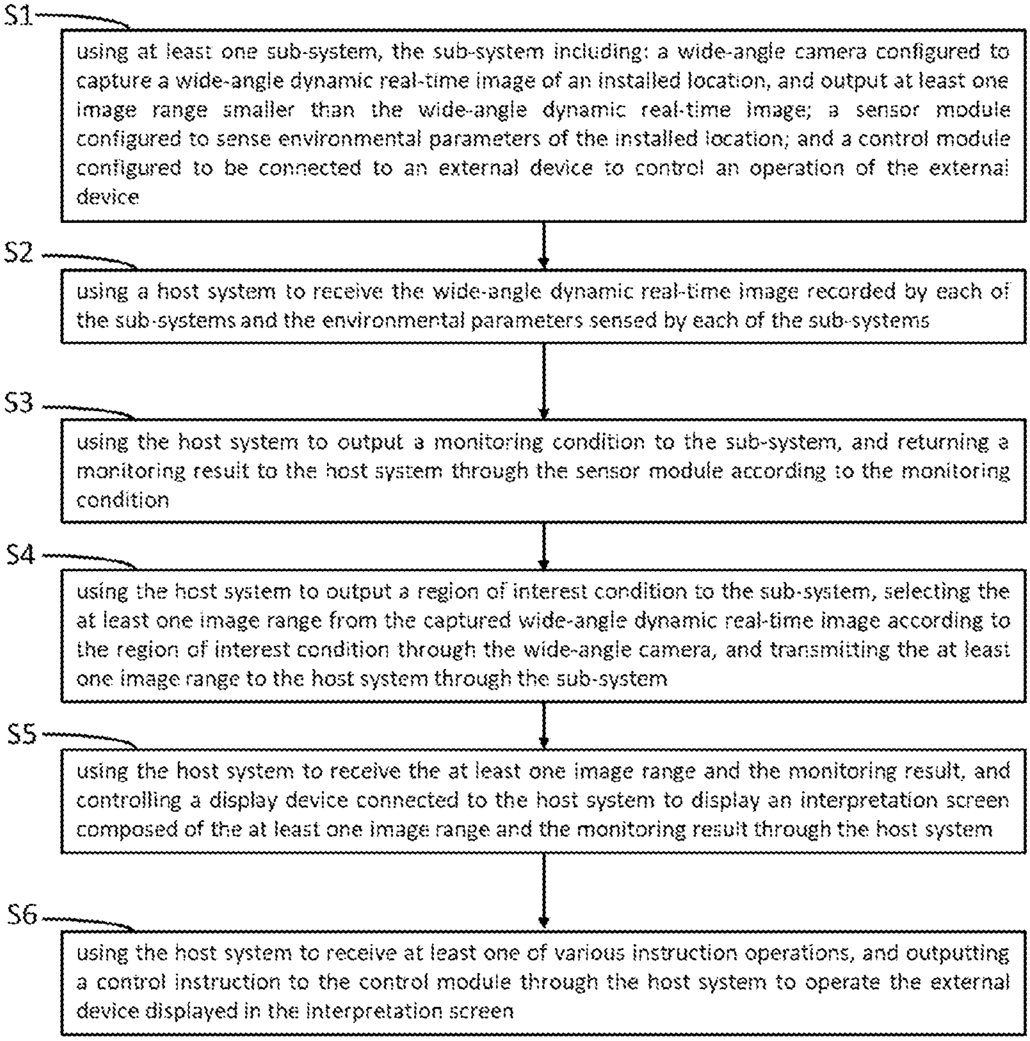
FIG. 8 is a schematic flow chart of an environmental managing and monitoring method according to one embodiment of the present application.

Please refer to FIG. 8, FIG. 8 is a schematic flow chart of an environmental managing and monitoring method according to one embodiment of the present application. The present application also provides an environmental management monitoring method to assist monitors in obtaining real-time information of the monitoring field and controlling device in the monitoring field. The environmental managing and monitoring method includes:

S1: using at least one sub-system, the sub-system including a wide-angle camera configured to capture a wide-angle dynamic real-time image of an installed location, and output at least one image range smaller than the wide-angle dynamic real-time image; a sensor module configured to sense environmental parameters of the installed location; and a control module configured to be connected to an external device to control an operation of the external device.

S2: using a host system to receive the wide-angle dynamic real-time image recorded by each of the sub-systems and the environmental parameters sensed by each of the sub-systems.

S3: using the host system to output a monitoring condition to the sub-system, and returning a monitoring result to the host system through the sensor module according to the monitoring condition.

S4: using the host system to output a region of interest condition to the sub-system, selecting the at least one image range from the captured wide-angle dynamic real-time image according to the region of interest condition through the wide-angle camera, and transmitting the at least one image range to the host system through the sub-system.

S5: using the host system to receive the at least one image range and the monitoring result, and controlling a display device connected to the host system to display an interpretation screen composed of the at least one image range and the monitoring result through the host system.

S6: using the host system to receive at least one of various instruction operations, and outputting a control instruction to the control module through the host system to operate the external device displayed in the interpretation screen.

It should be specially noted that the execution order of the process S3 and the process S4 can be exchanged with each other. The monitoring result includes location information, the ROI condition is generated based on the location information, and the image range selected by the wide-angle camera includes the location information range.

In the embodiment in which the process S3 is executed first and then the process S4 is executed, the condition of the region of interest output by the host system is generated according to the monitoring result. Specifically, the monitoring result includes location information, the ROI condition is generated based on the location information, and the image range selected by the wide-angle camera includes the location information. At this time, even if the abnormality cannot be observed from the wide-angle dynamic real-time image, the image range circled in the interpretation screen can be an interval containing the abnormality of the monitoring result, which is convenient for the monitor to observe. In this embodiment, the display device controlled by the host system can start recording a video of the appearance changes of the region with abnormal monitoring results in advance before the abnormal status occurs, and store the video of the appearance changes of the region with abnormal monitoring results in the host system or an event database connected to the host system.

In one embodiment in which the process S4 is executed first and then the process S3 is executed, the monitoring conditions output by the host system may include the position coordinates of the image range area. At this time, even if there is no abnormality in the monitoring results, the host system can also formulate more accurate monitoring conditions according to the position coordinates of a region of the image range. For example, when the wide-angle camera detects that the color of the liquid in the tank has changed, but the temperature sensed by the sensor module has not changed, the host system will automatically output other monitoring conditions, such as the ratio of chemicals in the tank, and the monitoring parameters such as pressure, etc., and the host system records the change data of the monitoring results from the time point when the liquid in the tank body changes, and record a video of the image range of the same time period, and stores them in the host system or in the event database connected to the host system.

Regarding the specific details of the host system in the first two embodiments, reference may be made to the description paragraphs of the host system 10 in the present application, and will not be repeated here.

Please refer to FIG. 9. FIG. 9 is a schematic flowchart of the environmental managing and monitoring method according to another embodiment of the present application, wherein the environmental management monitoring method further includes:

S11: classifying and marking the environmental parameters of different categories on the wide-angle dynamic real-time image.

S12: controlling the display device to display the marked wide-angle dynamic real-time image, and operating the external device marked in the marked wide-angle dynamic real-time image by receiving at least one of multiple instruction operations.

It should be noted that, in the embodiment of the host system of the present application connecting the event database and the query analysis module, the environmental parameters marked in the process S11 are also stored in the event database and the query analysis module synchronously. At this time, the event database, the host system, and the query analysis module first modularize the different devices and corresponding sensing parameters in the wide-angle real-time dynamic image, and then analyze them accordingly. For example, the monitoring results of different tanks and different switches in the wide-angle real-time dynamic images are modularized respectively. In addition to improve the analysis efficiency of the computing unit, through different markings, the changes in the analysis results in the monitoring result collection A1 and the abnormal sensing parameter collection A2 can also be displayed in real time through changes in the marking rules.

Regarding the specific details of the aforementioned monitoring result collection A1 and abnormal sensing parameter collection A2, refer to the paragraphs in the description of the host system 10 in the present application, and will not be repeated here.

Please refer to FIG. 10, FIG. 10 is a schematic flowchart of the environmental managing and monitoring method according to yet another embodiment of the present application. The environmental managing and monitoring methods further includes:

S21: outputting an abnormal status condition to the sub-system, and controlling the sub-system to sense an abnormal status.

S22: generating an abnormal status information through the sub-system when the wide-angle dynamic real-time image and the environmental parameters sensed by the sub-system satisfies the abnormal status condition.

S23: transmitting the abnormal status information to the host system and the alarm device through the sub-system.

In one embodiment of the present application, the abnormal status condition is generated according to the monitoring result and the image range. For example, the host system compares the received monitoring results with the image range, and uses deep learning modules (such as multi-layer perceptron (MLP), deep neural network (DNN), convolutional neural network (CNN), recurrent neural network (RNN) etc. to read the sensor parameters of different special situations stored in the event database connected to the host system to establish abnormal status condition, and automatically generates new identification features. In this case, the new abnormal identification feature is generated based on the old monitoring results and image ranges, and is transmitted to the sub-system for feature identification of abnormal status conditions.

Figure 11:
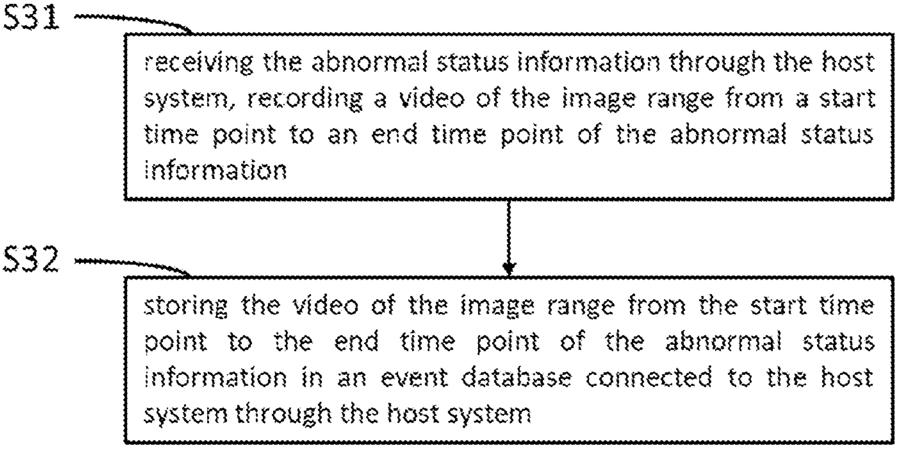
FIG. 11 is a schematic flow chart of the environmental managing and monitoring method according to another embodiment of the present application.

Please refer to FIG. 11, FIG. 11 is a schematic flow chart of the environmental managing and monitoring method according to another embodiment of the present application. The environmental managing and monitoring methods further includes:

S31: receiving the abnormal status information through the host system, recording a video of the image range from a start time point to an end time point of the abnormal status information.

S32: storing the video of the image range from the start time point to the end time point of the abnormal status information in an event database connected to the host system through the host system.

Figure 12:
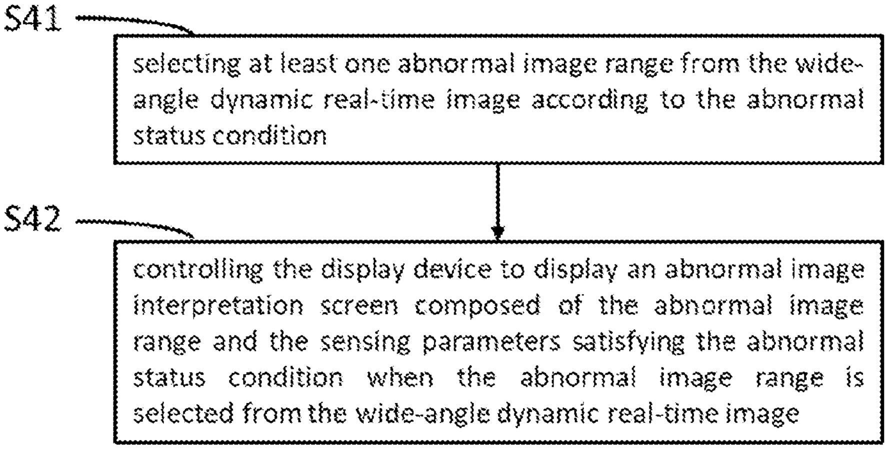
FIG. 12 is a schematic flowchart of the environmental managing and monitoring method according to yet another embodiment of the present application.

Please refer to FIG. 12, FIG. 12 is a schematic flowchart of the environmental managing and monitoring method according to yet another embodiment of the present application. The environmental managing and monitoring methods also include:

S41: selecting at least one abnormal image range from the wide-angle dynamic real-time image according to the abnormal status condition.

S42: controlling the display device to display an abnormal image interpretation screen composed of the abnormal image range and the sensing parameters satisfying the abnormal status condition when the abnormal image range is selected from the wide-angle dynamic real-time image.

Through the environmental managing and monitoring method provided by the aforementioned S31~S32 and S41~S42, the recording video and monitoring results of each abnormal status can be recorded and stored in the host system 10 in real time or in the event database connected to the host system 10, to facilitate administrators to analyze and improve the causes of abnormal status conditions and save accident evidence. For example, through the object tracking conditions mentioned in the foregoing paragraphs of the description of the present application, the event videos and sensing data of abnormal events detected by the environmental management monitoring system, including people wearing non-compliant device entering the monitoring area, liquid and gas leakage, internal rupture of pipelines, etc., are stored in the event database. For details about the event database, query analysis module, and image and data fusion display module, refer to the descriptions of the event database 30, query analysis module 40, and image and data fusion display module 11 in the foregoing paragraphs of the present application.

The present application has at least the following beneficial effects: the embodiments of the present application can be implemented by combining the filtered sensing signals and wide-angle dynamic real-time images into a real-time interpretation screen through the host system, and present the interpretation screen on the display panel connected to the host system, to monitor the on-site conditions of the monitoring environment, and help monitors intuitively and specifically understand and judge the details of the monitored field. In addition, the environmental managing and monitoring system of the present application can also automatically monitor whether an emergency event occurs and alert monitor when the emergency event occur, and at the same time record an overall process of the emergency event in detail to facilitate the subsequent analysis of abnormal status, so as to achieve the effect of accelerating the efficiency of the evidence collection and the analysis of the cause of the accident. Furthermore, through the environmental managing and monitoring system of the present application, the selection of abnormal status conditions and image ranges of areas of close concern can also be automatically selected by the monitoring system, so as to greatly reduce a consumption of monitoring resources. In addition, abnormal status conditions in the monitored field can be automatically detected by the sub-system and eliminated through the control of the host system, thereby greatly improving an operational stability of the monitored field and increasing the efficiency of reducing damage in a timely manner.

It should be noted that the combination of each element in the present application preferably forms the above multiple embodiments, but this should not be interpreted as a limitation of the present application. That is, each element in the present application can also have more combinations, not limited to the above multiple embodiments.

In this paper, specific examples are used to illustrate the principles and implementation methods of the present application, and the descriptions of the above embodiments are only used to help understand the technical solutions and core ideas of the present application. Those of ordinary skill in the art should understand that they can still modify the technical solutions described in the foregoing embodiments, or perform equivalent replacements for some of the technical features. These modifications or replacements do not make the essence of the corresponding technical solutions depart from a scope of the technical solutions of the various embodiments of the present application.

What is claimed is:

1. An environmental managing and monitoring system configured to assist monitors to obtain a real-time information of a monitoring field and control an external device in the monitoring field, the environmental managing and monitoring system comprising:

at least one sub-system comprising:

a wide-angle camera configured to capture a wide-angle dynamic real-time image of an installed location, and output at least one image range smaller than the wide-angle dynamic real-time image;

a sensor device configured to sense an environmental parameter of the installed location; and a control device configured to be connected to the external device to control an operation of the external device; and a host apparatus connected to each of the sub-systems, wherein the host apparatus is configured to receive the wide-angle dynamic real-time images recorded by each of the sub-systems and the environmental parameter sensed by each of the sub-systems;

wherein the host apparatus is configured to output a monitoring condition to the sub-system, wherein the sensor device returns a monitoring result to the host apparatus according to the monitoring condition;

wherein the host apparatus is configured to output a region of interest condition to the sub-system, wherein the wide-angle camera selects the at least one image range from the captured wide-angle dynamic real-time image according to the region of interest condition, and transmits the at least one image range to the host apparatus;

wherein the monitoring result comprises a location information, the region of interest (ROI) condition is generated according to the location information, and the image range selected by the wide-angle camera comprises a range of the location information;

wherein the host apparatus is configured to control a display device connected to the host apparatus to display an interpretation screen composed of the at least one image range and the monitoring result after receiving the at least one image range and the monitoring result; and wherein the host apparatus is configured to receive at least one of various command operations, and output a control command to the control device to operate the external device displayed in the interpretation screen.

2. The environmental managing and monitoring system according to claim 1, wherein the sensor device comprises a sound source sensor installed on the wide-angle camera, the monitoring condition comprises a sound source detection condition, and the sensor device integrates a sound source location information of a sound source into the monitoring result when the sound source sensor senses the sound source for satisfying the sound source detection condition;

wherein the ROI condition is generated according to the sound source position information, and wherein the image range selected by the wide-angle camera comprises a range of the sound source position information.

3. The environmental managing and monitoring system according to claim 1, wherein the image range selected by the sub-system moves along with an action for satisfying an action condition when the ROI condition comprises the action condition.

4. The environmental managing and monitoring system according to claim 1, wherein the host apparatus comprises a data management device configured to classify the environmental parameters into different categories and annotate the environmental parameter on the wide-angle dynamic real-time images;

wherein the host apparatus is configured to control the display device to display the annotated wide-angle dynamic real-time images, and operate the external device annotated in the annotated wide-angle dynamic real-time image by receiving at least one of a plurality of instruction operations.

5. The environmental managing and monitoring system according to claim 1, wherein the sensor device is connected to the external device, and the environmental parameter further comprises an operating status parameter of the external device.

6. The environmental managing and monitoring system according to claim 1, wherein the sub-system further comprises an edge computing device and an abnormality detection and alarm device, and wherein the sub-system is connected to an alarm device;

the edge computing device is configured to sense an abnormal status according to an abnormal status condition output by the host apparatus, wherein the abnormality detection and alarm device generates an abnormal status information when the wide-angle dynamic real-time image and the environmental parameter sensed by the sub-system satisfies the abnormal status condition;

wherein the abnormality detection and alarm device is configured to transmit the abnormal status information to the host apparatus and the alarm device.

7. The environmental managing and monitoring system according to claim 6, wherein the edge computing device is configured to select at least one abnormal image range from the wide-angle dynamic real-time image according to the abnormal status condition, wherein the host apparatus controls the display device to display an abnormal image interpretation screen composed of the abnormal image range and the sensing parameters meeting the abnormal status condition when the abnormal image range is selected from the wide-angle dynamic real-time image.

8. The environmental managing and monitoring system according to claim 6, wherein the host apparatus is configured to record a video of the image range from a starting time point to an end time point of the abnormal status information when the host apparatus receives the abnormal status information;

wherein the host apparatus is configured to store the video of the image range from the starting time point to the end time point of the abnormal status information in an event database connected to the host apparatus.

9. The environmental managing and monitoring system according to claim 6, wherein the host apparatus records a start time point and an end time point of the abnormal status information when the host apparatus receives the abnormal status information;

wherein the host apparatus is configured to mark the start time point and the end time point on a video of the wide-angle dynamic real-time image, and a marked video of the wide-angle dynamic real-time image is stored in an event database connected to the host apparatus.

10. The environmental managing and monitoring system according to claim 6, wherein the host apparatus is also connected to an abnormal notification device, and the host apparatus sends a message to a monitor through the abnormal notification device when the host apparatus receives the abnormal status information.

11. An environmental managing and monitoring method to assist monitors in obtaining real-time information of the monitoring field and controlling an external device in the monitoring field, wherein the environmental managing and monitoring method comprises:

using at least one sub-system comprising:

a wide-angle camera configured to capture a wide-angle dynamic real-time image of an installed location, and output at least one image range smaller than the wide-angle dynamic real-time image;

a sensor device configured to sense an environmental parameter of the installed location; and a control device configured to be connected to the external device to control an operation of the external device;

using a host apparatus to receive the wide-angle dynamic real-time image recorded by each of the sub-systems and the environmental parameter sensed by each of the sub-systems;

using the host apparatus to output a monitoring condition to the sub-system, and returning a monitoring result to the host apparatus through the sensor device according to the monitoring condition;

using the host apparatus to output a region of interest condition to the sub-system, selecting the at least one image range from the captured wide-angle dynamic real-time image according to the region of interest condition through the wide-angle camera, and transmitting the at least one image range to the host apparatus through the sub-system, wherein the monitoring result comprises a location information, wherein the region of interest (ROI) condition is generated according to the location information, and wherein the image range selected by the wide-angle camera comprises a range of the location information;

using the host apparatus to receive the at least one image range and the monitoring result, and controlling a display device connected to the host apparatus to display an interpretation screen composed of the at least one image range and the monitoring result through the host apparatus; and using the host apparatus to receive at least one of various instruction operations, and outputting a control instruction to the control device through the host apparatus to operate the external device displayed in the interpretation screen.

12. The environmental managing and monitoring method according to claim 11, wherein the environmental managing and monitoring method further comprises:

classifying and marking the environmental parameters of different categories on the wide-angle dynamic real-time image; and controlling the display device to display the marked wide-angle dynamic real-time image, and operating the external device marked in the marked wide-angle dynamic real-time image by receiving at least one of multiple instruction operations.

13. The environmental managing and monitoring method according to claim 11, wherein the environmental managing and monitoring method further comprises:

outputting an abnormal status condition to the sub-system, and controlling the sub-system to sense an abnormal status;

generating an abnormal status information through the sub-system when the wide-angle dynamic real-time image and the environmental parameters sensed by the sub-system meet the abnormal status condition; and transmitting the abnormal status information to the host apparatus and the alarm device through the sub-system.

14. The environmental managing and monitoring method according to claim 13, wherein the environmental managing and monitoring method further comprises:

receiving the abnormal status information through the host apparatus, recording a video of the image range from a start time point to an end time point of the abnormal status information; and storing the video of the image range from the start time point to the end time point of the abnormal status information in an event database connected to the host apparatus through the host apparatus.

15. The environmental managing and monitoring method according to claim 13, wherein the environmental managing and monitoring method further comprises:

selecting at least one abnormal image range from the wide-angle dynamic real-time image according to the abnormal status condition; and controlling the display device to display an abnormal image interpretation screen composed of the abnormal image range and the sensing parameters meeting the abnormal status condition when the abnormal image range is selected from the wide-angle dynamic real-time image.

* * * * *